Nov. 7, 1944. W. H. ROBERTS 2,362,308
APPARATUS FOR TESTING PRIME MOVERS
Filed March 12, 1942 4 Sheets-Sheet 1

Inventor
William H. Roberts
by Wilkinson & Mawhinney
Attorneys.

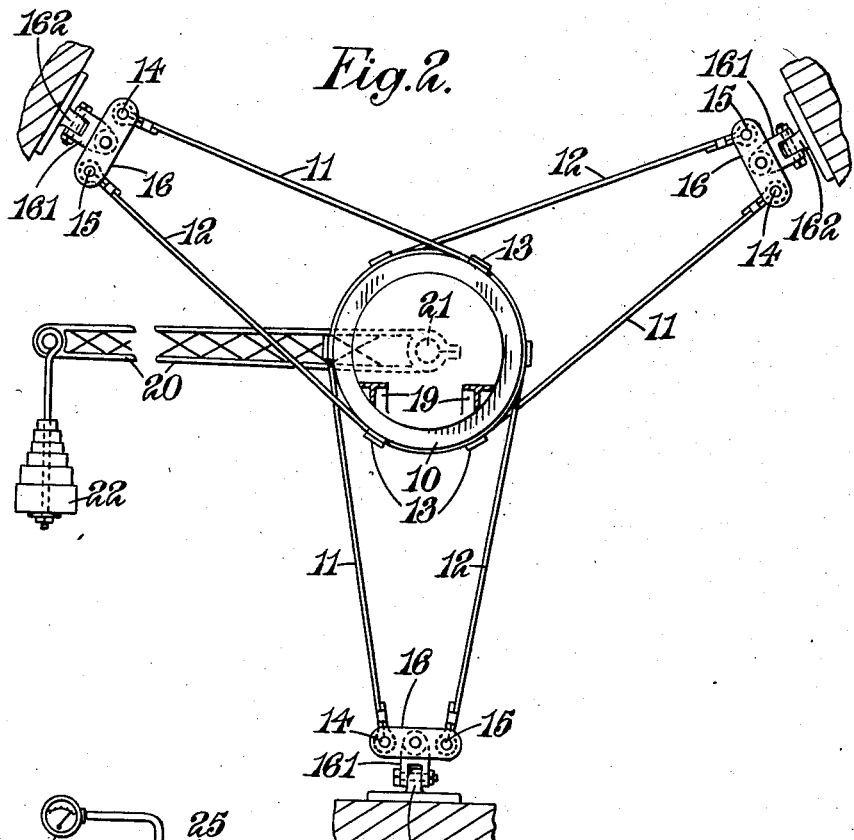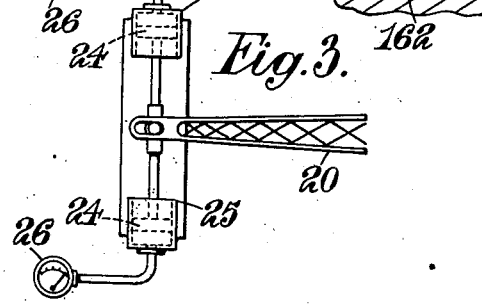

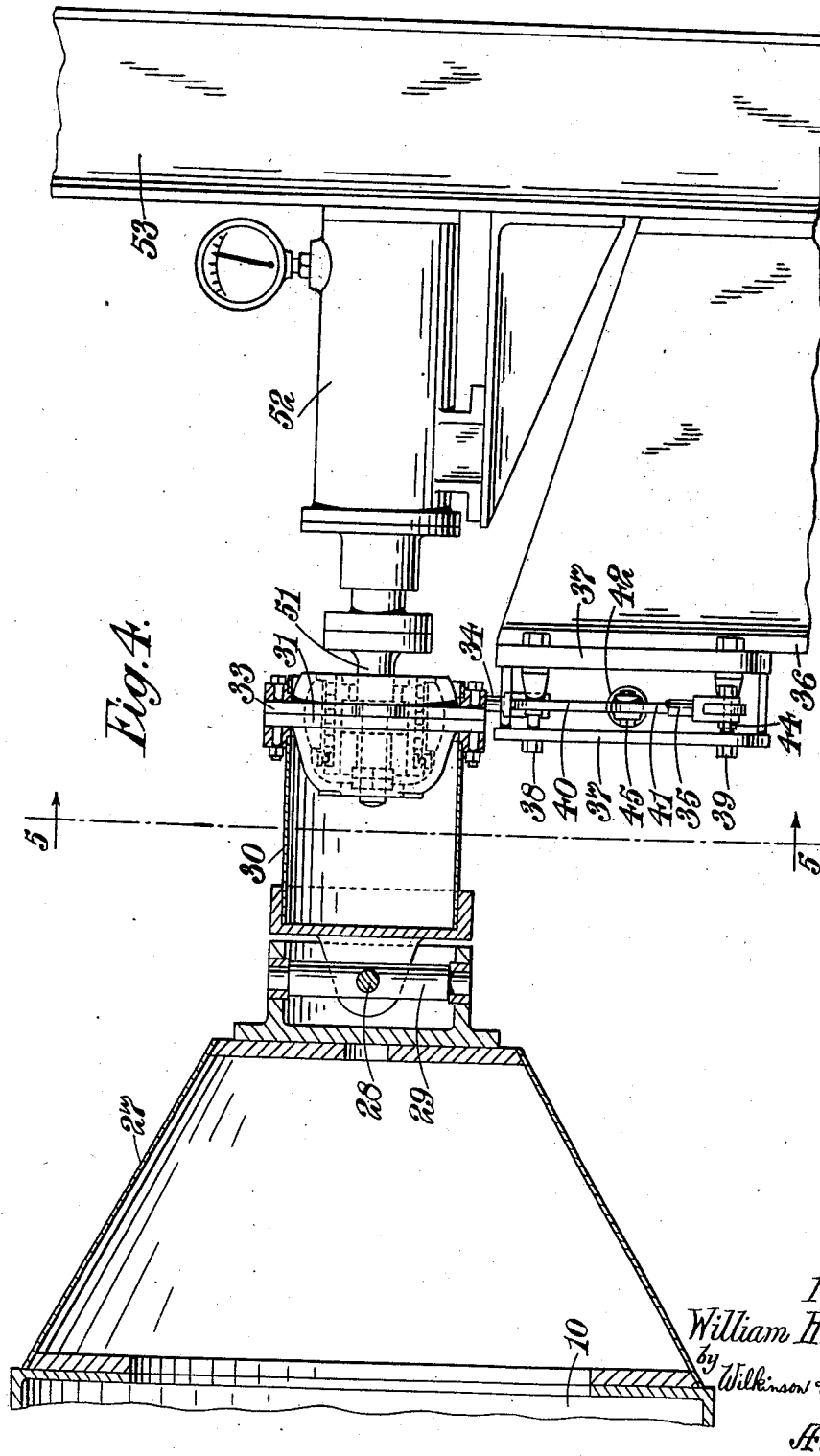

Nov. 7, 1944.  W. H. ROBERTS  2,362,308
APPARATUS FOR TESTING PRIME MOVERS
Filed March 12, 1942  4 Sheets-Sheet 4

Inventor
William H. Roberts
by Wilkinson & Mawhinney
Attorneys.

Patented Nov. 7, 1944

2,362,308

UNITED STATES PATENT OFFICE 2,362,308

APPARATUS FOR TESTING PRIME MOVERS

William Henry Roberts, Gloucester, England, assignor to Rotol Airscrews Limited, Gloucester, England, a British company Application March 12, 1942, Serial No. 434,445
In Great Britain October 11, 1940

10 Claims. (Cl. 73—136)

This application corresponds to the application of William Henry Roberts, Serial No. 15,181/40, which was filed in Great Britain on October 11, 1940.

This invention relates to the testing of prime movers and is concerned with apparatus for this purpose of the type in which a structure or plate (hereinafter referred to as the engine-mounting) to carry the prime mover, is itself supported by cables or tie-members disposed more or less radially to the axis of rotation of the prime mover. The invention is particularly suitable for testing aircraft engines with their airscrews, since it can be used to measure directly and in a simple manner the various aspects of engine and airscrew performance, such as airscrew-thrust, horse-power, torque-reaction or torque-balance.

This invention comprises a testing apparatus of the type described in which the engine-mounting is itself so mounted as to have some degree of freedom to rotate about the axis of rotation of the engine, in combination with means for measurably resisting such movement whereby a direct measure of the engine-torque, and therefore of the power developed, can be obtained.

According to yet another feature of this invention, the cables or tie-members are arranged in symmetrical radial pairs which are secured respectively to opposite sides of the engine-mounting and are so connected together at their anchorage that a virtual lengthening of one member of a pair is accompanied by a corresponding shortening of the other member of the pair.

Further details of the invention will be described hereinafter in relation to a specific embodiment thereof, and the novel details pointed out in the claims appended to this specification.

In the accompanying drawings,

Figure 2 is a sectional elevation on the line 2—2 of Figure 1, and

Figure 3 is a detail view of modifications, these three figures being diagrammatic to illustrate the principles involved in the invention;

Figure 4 is a side elevation showing a practical form of the torque and thrust measuring arrangements.

Figure 1:
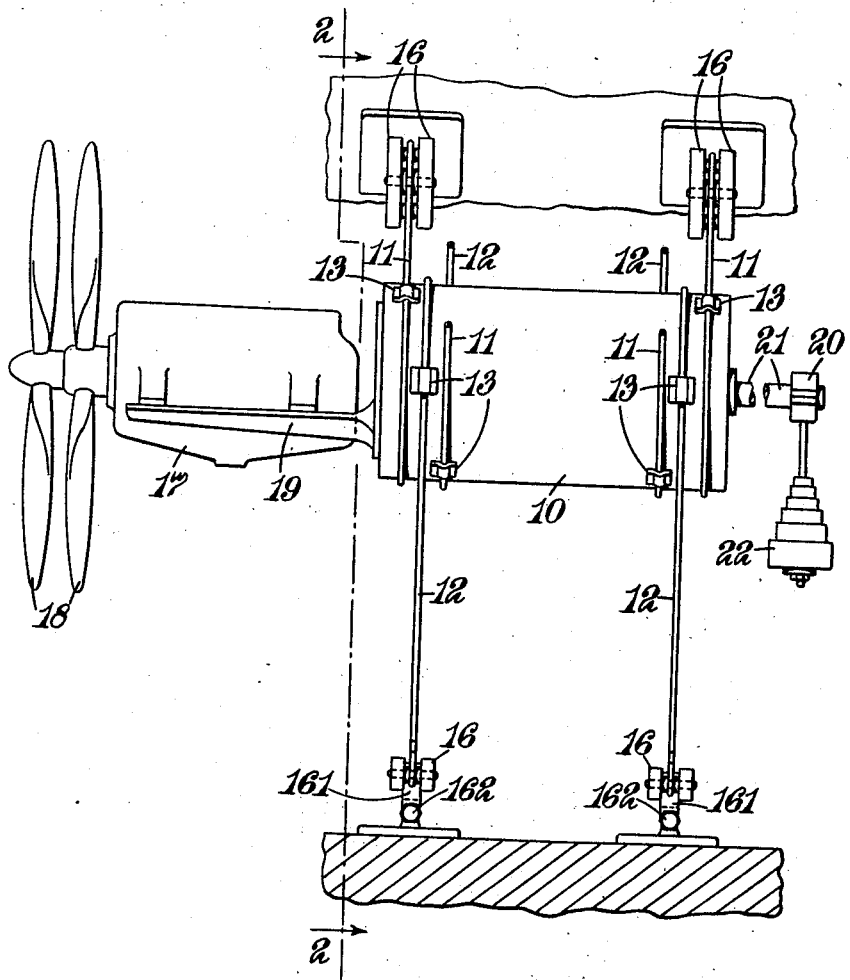
Figure 1 is a side elevation of the apparatus.

Referring to Figures 1 to 3, the engine-mounting comprises a cylindrical or drum-like member 10 supported with its axis horizontal by sets of cables or tie-members at each end. The two sets are exactly alike and each set comprises three pairs of cables 11 and 12, respectively, which may be formed in separate lengths or may be formed in one piece extending around the drum; in either case each pair of cables is anchored to the periphery of the drum by suitable clamps or locking devices 13, and these are spaced away from the point at which the cable leaves the drum tangentially so that rotation of the drum through small angular movements does not vary in space the point at which the cable leaves the drum tangentially.

The other ends of the cables 11, 12 are connected together in such a manner that the virtual lengthening of one and shortening of the other, by rotation of the drum, are compensated and this may be effected as shown in Figure 2 by connecting the free ends of the cables to opposite ends 14, 15, respectively, of a lever 16 which is centrally pivoted on a link 161 which is itself pivoted to the supporting structure about an axis 162. The axis 162 is at right-angles to the pivotal axis of the lever, and gives freedom to the engine-mounting in an axial direction. Small angular movements of the drum 10 about its longitudinal axis are accommodated by rocking movement of each of the levers 16 on its pivot-pin.

The left-hand end of the drum 10, in Figure 1, is arranged to receive the aero-engine 17, with its airscrew or airscrews 18, which is to be tested, and for this purpose the end 10 of the drum is arranged to receive engine-bearers 19 or a mounting plate or any other structure appropriate to the particular type of engine.

Since the cables 11 and 12 are arranged nonradially, and tangentially to a circle concentric with the drum axis, the drum, which constitutes the engine-mounting, has freedom, in a limited degree, to rotate about its axis, and the axis of the engine, or of the airscrews, is arranged to be in line with the drum axis; it is necessary, however, to restrain the rotational movement of the drum to resist the engine torque, and at the same time to give a measurement of the reaction torque. A simple arrangement for this purpose is indicated diagrammatically in Figures 1 and 2 in which a radial arm 20 extending horizontally from a shaft 21 at the rear end of the drum is arranged to be loaded, as indicated diagrammatically, by the weights 22. The weight required to maintain the arm 20 horizontal is proportional to the engine torque. Fixed stops may be provided engaging the arm 20 to limit its angular movement.

Instead of using weights on the arm 20 to resist the engine torque, the arrangement diagrammatically shown in Figure 4 may be used; the end of the arm 20 is coupled to a piston 24 operating in a cylinder 25 filled with fluid, preferably a liquid, and the pressure exerted on the fluid is measured by means of a pressure-gauge 26. Preferably this arrangement is duplicated, as illustrated, so as to resist and measure torque exerted on the arm 20 in either direction.

Figure 5:
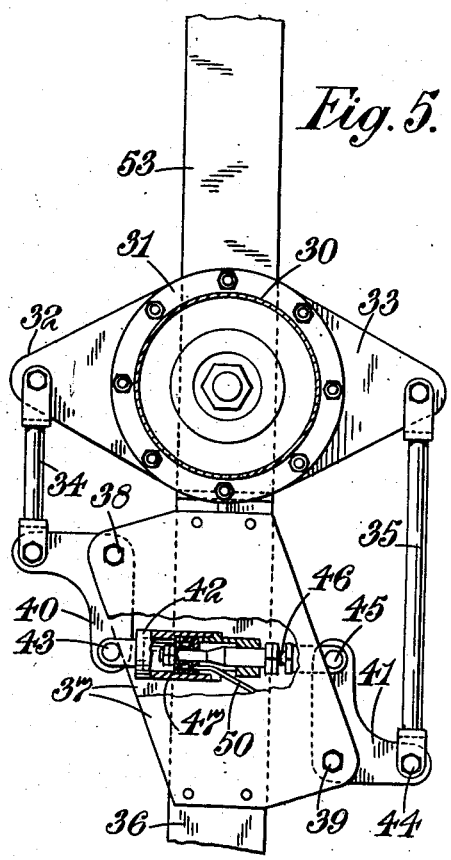
Figure 5 is a part sectional view on the line 5—5 of Figure 4.

Any convenient means is provided for measuring or measuring and restraining the axial thrust on the drum 10, and in this connection reference may now be made to Figures 4 and 5 of the drawings.

At the rear, or right-hand end, of the drum 10 an extension 27 rigidly secured on it carries a universal joint, whereof the axes are indicated at 28, 29, respectively, to transmit any movements resulting from torque or thrust to a sleeve 30 secured to a housing 31. As shown in Figure 5, this housing 31 has two laterally extending arms 32, 33 to which are connected respectively links 34, 35. On a suitable stanchion 36 there are secured a pair of plates 37 carrying pivot-pins 38, 39 for two bell-crank-levers 40, 41, respectively. The link 34 is connected to one arm of the bell-crank-lever 40 and the other arm of this lever carries a cylinder 42 by a pivot-pin 43. The link 35 is coupled to one arm of the bell-crank-lever 41 by a pivot-pin 44, and the other arm of the same lever is connected by a pivot-pin 45 with a piston-rod 46 connected to a piston 47 in the cylinder 42. Suitable hydraulic packing-rings are provided in the piston and cylinder which is filled with oil and a pipe-connection 50 provides communication from the interior thereof to a pressure-gauge. It will be seen that with this arrangement any counterclockwise rotational movement of the casing 31 produced by the torque tends to compress the liquid in the cylinder 42 which thereby provides the necessary reaction to the torque, and the pressure generated in the cylinder gives the value of this torque. The casing 31 above-mentioned is provided internally with a spherically mounted thrust bearing which transmits the longitudinal thrust developed by the airscrew on the drum 10 to a member 51 which, in turn, transmits it to a hydraulic cylinder and plunger 52 which, in turn, provides the necessary reaction and measurement of the thrust. The cylinder 52 is mounted on a suitably rigid and braced stanchion 53. The thrust is indicated by a simple pressure gauge as shown in Figure 4 which indicates the pressure exerted on the liquid inside the cylinder due to the axial thrust.

Apparatus according to this invention is particularly suitable for testing aircraft engines with their airscrews, and obtaining direct readings of the two important characteristics, namely, horsepower and thrust, with great facility. The fact that direct readings of the engine performance in these respects can be obtained is particularly valuable when using variable-pitch airscrews since it is very desirable that figures should be available throughout the range of pitch-adjustment of the airscrew. The apparatus is also of great convenience when engines fitted with counter-rotating airscrews are to be tested. It is desirable that the torque reactions of the two airscrews should balance one another or at least that any resultant torque should be known, and since the mounting gives a direct reading of the resultant torque on the engine-mounting, this result is achieved. Here again its value will be appreciated when variable-pitch airscrews are used and its is desirable to know all the effects arising with changes in pitch of the airscrews.

I claim:

1. An apparatus for testing a prime-mover, comprising a cylindrical drum shaped engine-mounting to carry the prime-mover, a number of pairs of cables disposed each pair radially of the engine mounting with its cables on opposite sides thereof with their inner ends so wrapped onto the engine-mounting that rotation of the engine-mounting, by th torque of a prime-mover mounted on it, causes one cable of each pair to unwrap from the engine-mounting and the other to wrap thereon, a separate anchorage for the outer ends of the cables in each pair, each which anchorage permits the cables to move equally and oppositely to a limited extent as they wrap on and unwrap from the engine-mounting, and means acting on the engine-mounting measurably to balance the torque of a prime-mover mounted thereon.

2. An apparatus according to claim 1, comprising means acting on the engine-mounting measurably to balance the thrust of a prime-mover and airscrew unit mounted on the engine-mounting.

3. An apparatus according to claim 1 wherein each anchorage comprises a lever pivoted centrally and connected at its ends to the outer ends of the associated cables.

4. The combination with an engine-mounting that is free to rotate to a limited extent at least under the influence of the torque developed by a prime-mover mounted on it, of a cylinder filled with liquid, a piston in the cylinder, a connection between the piston and the engine-mounting by which rotation in one direction of the engine-mounting moves the piston into the cylinder, a second connection between the cylinder and the engine-mounting by which rotation in the aforesaid direction of the engine-mounting moves the cylinder in the opposite direction to the piston, and a pressure gauge for indicating the pressure of the liquid within the cylinder.

5. The combination with an engine-mounting that is free to rotate to at least a limited extent under the influence of the torque of a prime-mover carried by it, of two bell-crank levers pivoted on a fixed support with an arm of one approximately parallel to an arm of the other, a cylinder filled with liquid and connected to one said parallel arms, a piston slidable in said cylinder and connected to the other of said parallel arms, a separate connection from each other arm of the bell-crank levers to the engine-mounting at a point so spaced from its axis of rotation that rotation of the engine-mounting about its axis moves the piston and cylinder oppositely and a pressure gauge for indicating the pressure within the cylinder.

6. The combination with an engine-mounting supported with freedom for rotation about an axis, of a lever pivoted about said axis, connected to the engine-mounting to rotate therewith and having oppositely directed arms, a pair of bell-crank levers so pivoted on a fixed support and so connected each by one of its arms to a different one of the oppositely directed arms that the ends of their other arms move oppositely along a line transverse to their length, a cylinder filled with liquid and connected to the second mentioned arm of one bell-crank lever, a piston movable in the cylinder and connected to the second mentioned arm of the other bell-crank lever, and a pressure gauge for indicating the pressure within the cylinder.

7. Testing apparatus comprising a drum-shaped engine mounting, and means supporting said mounting for partial rotation, said means comprising radially arranged spaced pairs of flexible members, each pair of members having the inner ends thereof secured to the periphery of said mounting whereby rotation of said mounting will wind one member of each pair upon said mounting and unwind the other member of each pair from said mounting, and means at the outer ends of each pair of members for maintaining the latter taut.

8. Testing apparatus as set forth in claim 7 wherein said latter means includes a bar pivotally connected to the outer ends of said members and a pivotal support for said bar between the ends of the latter.

9. Testing apparatus as set forth in claim 7 which includes means actuated by rotation of said mounting for indicating the torque exerted thereon.

10. Testing apparatus as set forth in claim 7 which includes hydraulic means activated by rotation of said mounting for indicating the torque exerted thereon.

WILLIAM HENRY ROBERTS.